US011902255B2

(12) United States Patent
Paul et al.

(10) Patent No.: US 11,902,255 B2
(45) Date of Patent: *Feb. 13, 2024

(54) SYSTEMS AND METHODS FOR DELIVERING MESSAGES OVER A NETWORK

(71) Applicant: SLING MEDIA L.L.C., Foster City, CA (US)

(72) Inventors: John Michael Paul, Palo Alto, CA (US); Mark David Melin, Brisbane, CA (US); Sylvain Jack Niles, San Francisco, CA (US); Myles Patrick Cagney, Novato, CA (US)

(73) Assignee: Sling Media L.L.C., Foster City, CA (US)

( * ) Notice: Subject to any disclaimer, the term of this patent is extended or adjusted under 35 U.S.C. 154(b) by 522 days.

This patent is subject to a terminal disclaimer.

(21) Appl. No.: 17/013,847

(22) Filed: Sep. 7, 2020

(65) Prior Publication Data

US 2021/0075765 A1    Mar. 11, 2021

Related U.S. Application Data

(63) Continuation of application No. 16/025,385, filed on Jul. 2, 2018, now Pat. No. 10,771,437, which is a continuation of application No. 14/680,717, filed on Apr. 7, 2015, now Pat. No. 10,021,073, which is a
(Continued)

(51) Int. Cl.
*H04L 9/40*        (2022.01)
*H04L 67/1001*     (2022.01)
*H04L 67/142*      (2022.01)

(52) U.S. Cl.
CPC ........ *H04L 63/029* (2013.01); *H04L 67/1001* (2022.05); *H04L 67/142* (2013.01)

(58) Field of Classification Search
CPC .. H04L 63/029; H04L 67/142; H04L 67/1002
See application file for complete search history.

(56) References Cited

U.S. PATENT DOCUMENTS 7,627,658 B2 * 12/2009 Levett ................. G06F 9/46
                                          709/248
7,647,430 B2 *  1/2010 Ng .................... H04L 12/2823
                                          710/5
(Continued)

FOREIGN PATENT DOCUMENTS

WO   WO-2005038621 A2 *  4/2005   ............ H04L 67/10

*Primary Examiner* — Lynn D Feild
*Assistant Examiner* — Abdullah Almamun
(74) *Attorney, Agent, or Firm* — KW Law, LLP

(57) ABSTRACT

Systems and methods are described for delivering messages from one or more service hosts to clients via a network. A first request identifying the client is received at the message server, and a connection is established and maintained between the message server and the client in response to the first request. When a subsequent request that identifies the client is received from the service host, a message is transmitted from the message server to the client over the previously-established connection. The methods and techniques may be used, for example, to provide messages from various services to placeshifting devices or other clients communicating via the network.

12 Claims, 3 Drawing Sheets

Figure 1:
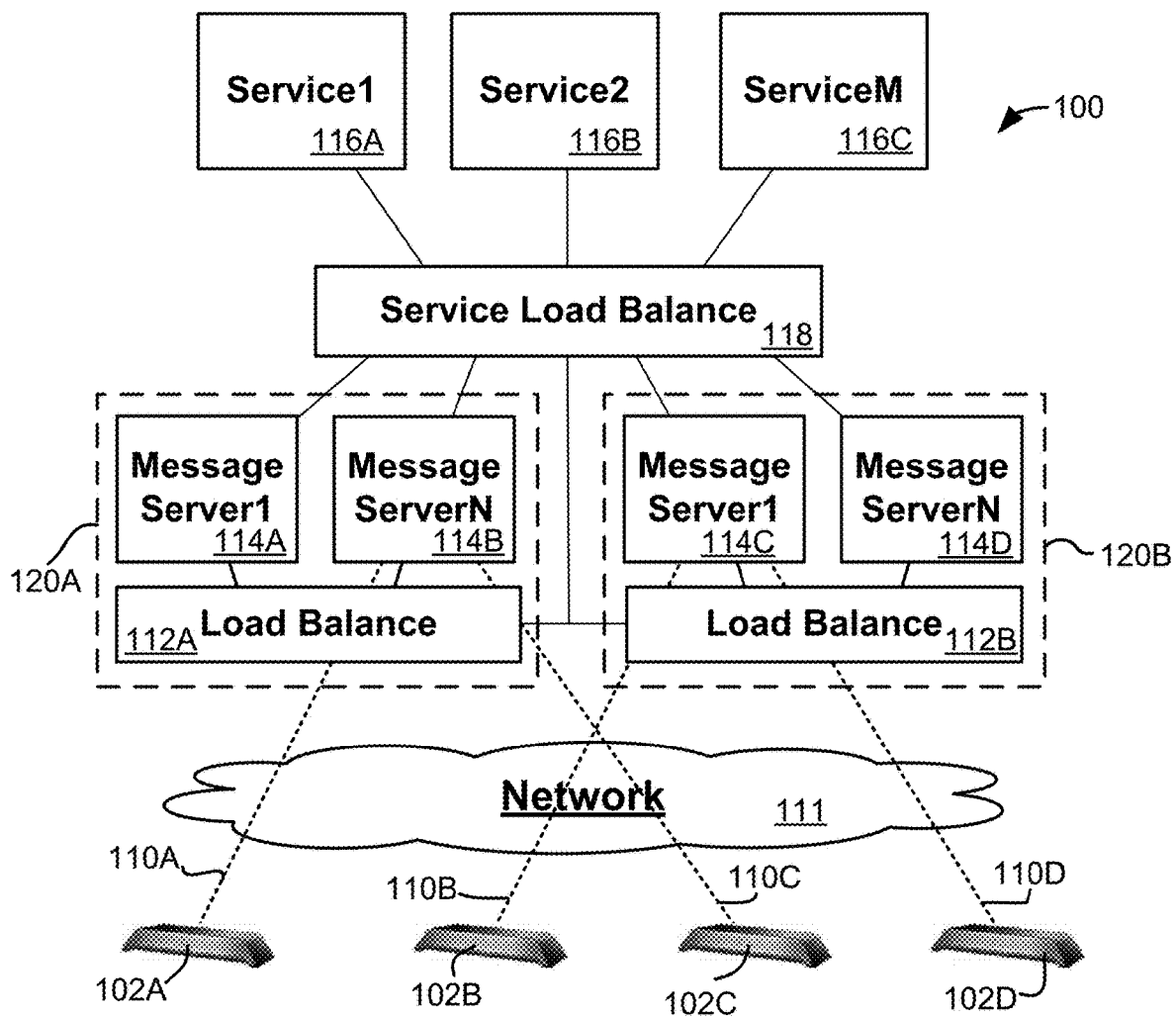

Related U.S. Application Data continuation of application No. 12/619,192, filed on Nov. 16, 2009, now Pat. No. 9,015,225.

(56) References Cited

U.S. PATENT DOCUMENTS

| | | | | |
|---|---|---|---|---|
| 8,145,719 B2 * | 3/2012 | Barman | ............... | H04L 67/02 |
| | | | | 709/227 |
| 10,021,073 B2 * | 7/2018 | Paul | ............... | H04L 67/1001 |
| 10,462,206 B2 * | 10/2019 | Thomas | ............... | H04L 65/1066 |
| 2002/0055966 A1 * | 5/2002 | Border | ............... | H04L 69/163 |
| | | | | 709/200 |
| 2002/0156901 A1 * | 10/2002 | Erickson | ............... | H04L 67/60 |
| | | | | 709/227 |
| 2007/0294407 A1 * | 12/2007 | Owen | ............... | H04L 63/029 |
| | | | | 709/226 |
| 2008/0189333 A1 * | 8/2008 | Schmidt | ............... | H04L 67/62 |
| 2009/0150518 A1 * | 6/2009 | Lewin | ............... | H04L 67/568 |
| | | | | 709/219 |
| 2009/0282445 A1 * | 11/2009 | Yang | ............... | H04N 21/812 |
| | | | | 725/93 |
| 2011/0150362 A1 * | 6/2011 | Mitra | ............... | H04N 1/00228 |
| | | | | 709/217 |

\* cited by examiner

SYSTEMS AND METHODS FOR DELIVERING MESSAGES OVER A NETWORK

PRIORITY CLAIM

This application is a continuation of U.S. patent application Ser. No. 16/025,385 (now U.S. Pat. No. 10,771,437) which is a continuation of U.S. patent application Ser. No. 14/680,717 filed on Apr. 7, 2015, which is a continuation of U.S. patent application Ser. No. 12/619,192 (now U.S. Pat. No. 9,015,225) filed on Nov. 16, 2009. These applications are incorporated herein by reference.

TECHNICAL FIELD

The present disclosure generally relates to systems and methods for delivering messages between devices communicating over a network. Such systems and techniques may be useful, for example, in providing messages from network-based services to set-top boxes, digital video recorders (DVRs), video game players, placeshifting devices and/or other clients.

BACKGROUND

The Internet and other digital communications networks continue to have significant effects on every aspect of personal and professional life. Network communications are becoming increasingly ubiquitous due to the reduced cost and increased capability of portable computing devices, as well as the increasing prevalence and capability of mobile telephony and other wireless communications technologies. Additionally, more and more devices, including set top boxes, television receivers, video game players, placeshifting devices, media players and the like, are becoming enabled for network communications.

While modern technologies allow increased mobility and improved access to data and services, a tradeoff often exists between network access and security. Although many homes and businesses have access to broadband network connectivity, for example, most of these network connections are protected by a firewall or the like to prevent unwanted intrusions. Firewalls and other structures, while effectively preserving the security of a home or other network, can have the undesired effect of preventing access to desired services or other features that are located on the opposite side of the firewall. For example, if a network service wishes to provide programming, data or instructions to a client that is located behind a firewall, such communications are often blocked to prevent security breaches. Configuring the firewall to allow access from the network service may be difficult for many users, and may also create undesirable security gaps that could be exploited by others. If a customer service representative, for example, needs to gain access to a device located behind a firewall to assist the user in configuring or using the device, such a connection may be very difficult to establish using conventional techniques.

In addition to preventing unwanted access to a secure network, then, firewalls and other security mechanisms may prevent legitimate and desired access to remotely-located content or services, particularly if the security mechanism is incorrectly or incompletely configured by the user. Challenges can therefore arise in effectively establishing connections between clients and services for media streaming, media recording, placeshifting, gaming and/or other applications.

As a result, it is now desirable to create systems and methods for reliably and conveniently transmitting messages from services to clients over a network. These and other desirable features and characteristics will become apparent from the subsequent detailed description and the appended claims, taken in conjunction with the accompanying drawings and this background section.

BRIEF SUMMARY

According to various exemplary embodiments, systems and methods are described for providing messages to devices communicating via a network. Certain methods and techniques described below may be used in some instances to provide messages to placeshifting devices, set top boxes, digital video recorders, video game players, media players, computing systems and/or other client systems. Such messages may be used, for example, to establish real-time or near real-time communications between the service and the client device as desired. While much of the following discussion uses placeshifting as an illustrative example, other embodiments may be equivalently applied in other applications and settings, including any settings relating to media streaming, media recording, game playing and/or the like.

Various embodiments provide a method to allow a first server to contact a client over a network using a message server. This method comprises receiving a first request identifying the client at the message server, establishing a connection between the message server and the client in response to the first request, receiving a second request from the first server at the message server, wherein the second request identifies the client, and, in response to the second request, transmitting a message from the message server to the client over the connection.

In other embodiments, a system to process messages from at least one service host to a plurality of clients is provided. The system comprises a plurality of message servers and a load balancer. The load balancer is configured to receive the connection requests from each of the plurality of clients and to assign each of the connection requests to one of the plurality of message servers. Each message server is configured to establish and maintain persistent connections with at least some of the plurality of clients in response to connection requests, and to transmit messages received from the at least one service host to the at least some of the plurality of clients over the persistent connections.

Still other embodiments provide a method to allow a first server to contact a client over a network. In this exemplary embodiment, a method comprises receiving a first request identifying the client, assigning the first request to an assigned one of a plurality of message servers, maintaining a persistent connection between the assigned one of the plurality of message servers and the client, receiving a second request from the first server, wherein the second request identifies the client, and, in response to the second request, transmitting a message from the assigned one of the plurality of message servers to the client over the persistent connection, wherein the message comprises information that allows the client to contact the first server and thereby establish the interaction between the service and the client.

Various other embodiments, aspects and features are described in more detail below.

BRIEF DESCRIPTION OF THE DRAWING FIGURES

Figure 2:
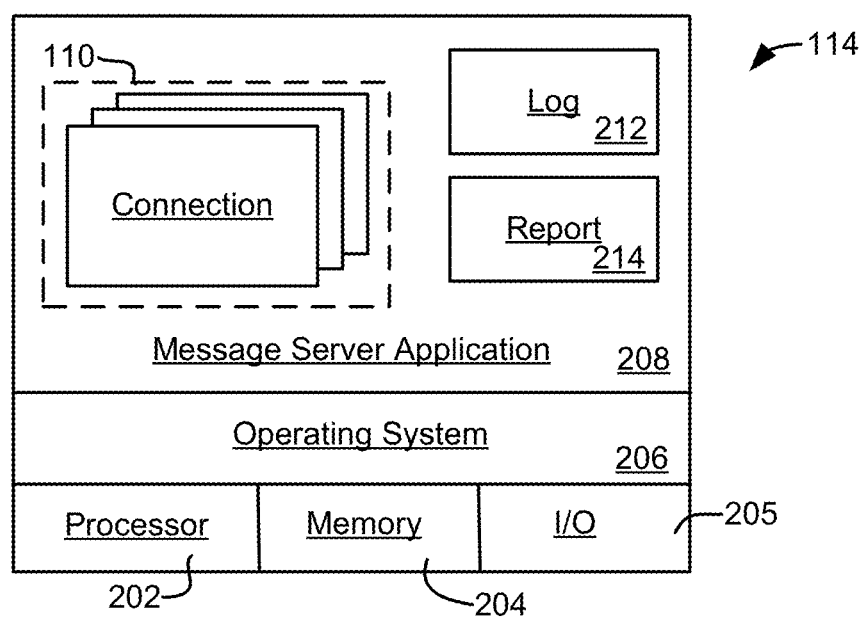

Exemplary embodiments will hereinafter be described in conjunction with the following drawing figures, wherein like numerals denote like elements, and FIG. 1 is a block diagram of an exemplary messaging system;

FIG. 2. is a block diagram of an exemplary message server; and

Figure 3:
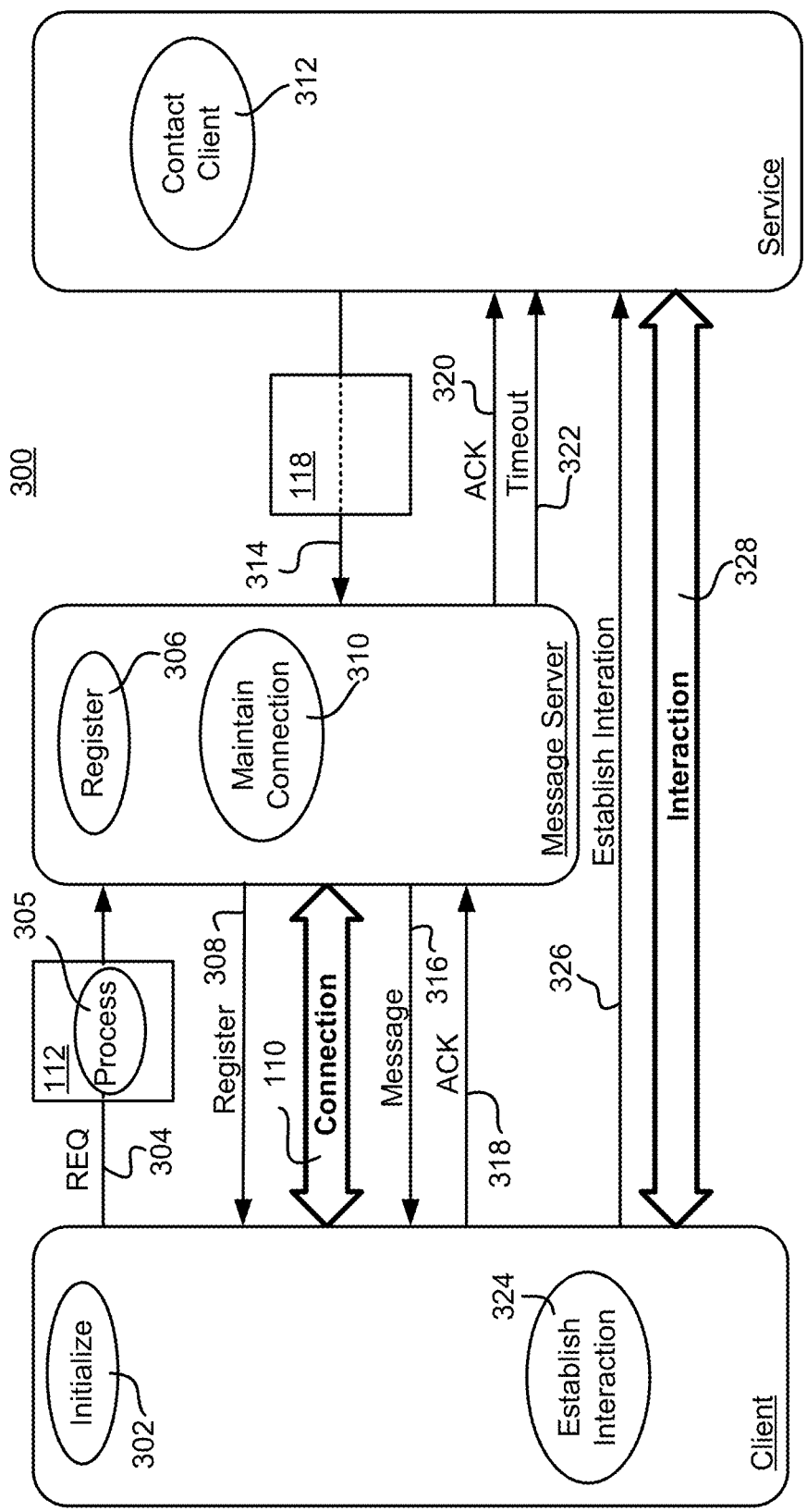

FIG. 3 is a diagram showing various exemplary techniques for processing messages between a client and a service.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, client devices are configured to initially contact a message server that is located on a digital network. The message server establishes a persistent connection with the client device that can be maintained over time. When a service later wishes to contact a particular client, the service notifies the message server, which suitably sends a message to the client over the persistent connection that identifies the service or that otherwise allows the client device to contact the requesting service for further communications. Using the information contained in the message, the client can establish a direct or other connection with the requesting service, thereby allowing real-time (or near real-time) interaction between clients and servers. This basic structure may be used in any number of settings, including placeshifting, media streaming, game playing, and/or any other application as desired.

Unlike techniques that rely upon intermittent polling by the client to obtain information from network-based services, various embodiments of the network server may be able to provide improved flexibility in contacting any number of different network services. Moreover, the use of a pre-existing connection allows particular devices to be contacted by one or more network services as information becomes available (e.g., in real-time or pseudo-real-time) rather than waiting for polling from the device. That is, messages can be "pushed" in real-time (or near real time) from the network server rather than waiting for the client to "pull" the information from the server. This relative immediacy provides a greatly improved user experience.

Although the discussion herein often refers to placeshifting devices and techniques for convenience of illustration, equivalent embodiments could apply the same structures and methods described herein in any number of other settings. To that end, the techniques described herein could be readily used to establish communications with or between any sorts of clients and/or services over any sort of network. Examples of such applications may include any types of media streaming applications, any types of media sharing or storage applications, video recording, video or computer gaming, and/or any other application(s) as desired. Indeed, the messaging techniques used herein could be equivalently applied to any number of client devices, such as set top boxes (STBs) or other television content receivers, digital video recorders (DVRs), video game players, computer systems and/or the like. Such devices may be contacted in real-time or on any other basis to provide programming instructions, data and/or other information as desired.

Turning now to the drawing figures and with initial reference to FIG. 1, an exemplary messaging system 100 for transmitting messages from any number of network servers 116A-C to any number of clients 102A-D suitably includes any number of message servers 114A-D, load balancers 112A-B, and a service load balancer 118. Each client device 102A-D maintains a connection 110A-D (respectively) with at least one message server 114 over a network 111. These connections 110 are appropriately initiated by the client device 102 and maintained by message server 114 so that the connections are already in place when one or more services 116A-C attempt to contact the client device 102. Connections may be initially assigned by any number of load balancers 112A-B, as appropriate. In the example of FIG. 1, message servers 114A-D are arranged into two clusters 120A-B of servers 114, with each cluster having its own load balancer 112A-B (respectively). Other embodiments may be logically and/or physically arranged in any other manner.

When a service 116 does intend to contact a particular client 102, the service 116 contacts the message server 114 that is maintaining the connection 110 to the desired client 102. Service 116 may forward messages to the appropriate message server 114 using one or more service load balancers 118 or the like. Upon receiving an instruction from a service 116, the appropriate message server 114 then sends a message to the client device 102 over the pre-existing and persistent connection 110. The receiving device 102 is then able to process the message as desired. In various embodiments, the receiving client 102 contacts the requesting service 116 to establish a communications session, to receive further instructions, or for any other purpose.

Client 102 may be any device, component, module, hardware, software application and/or the like that is capable of communicating over network 111. To that end, many different types of clients 102 may be implemented with any sort of general or special purpose hardware, software and/or firmware. In some embodiments, clients 102 may include standalone devices having network connectivity, such as any sort of placeshifting device, video game player, STB or other television programming receiver, digital video recorder, and/or the like. Other embodiments of clients 102 may include conventional personal computers, workstations and/or other systems. In still other embodiments, some types of clients 102 may include software client applications, applets or other processes executing on any sort of general or special purpose computing hardware.

Although the concepts described herein could be used in many different applications other than placeshifting, several examples of clients 102 suitable for use in placeshifting applications may be implemented using any of the various SLINGBOX products available from Sling Media of Foster City, California and/or any number of other suppliers. Many different types of placeshifting devices are generally capable of receiving media content from an external source, such as any sort of digital video recorder (DVR), set top box (STB), cable or satellite programming source, video disk player, and/or the like. In other embodiments, client 102 may be integrated with any sort of content-receiving or other capabilities. Some embodiments of client 102 may provide a hybrid STB or other receiver, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed and/or place shifted to a remote media player as appropriate. Such devices may also include a content database stored on a hard disk drive, memory, or other storage medium to support a personal or digital video recorder (DVR) feature or other content library as appropriate.

Hence, in some embodiments, a media receiver or other source of content may be physically and/or logically contained within a common component, housing or chassis with client 102. Examples of conventional placeshifting functions, features, systems and structures are described in United States Patent Publication No. 2006/0095471, although the features described herein could be equivalently applied with any number of other techniques and structures in addition to those described in that particular publication.

Some implementations of client 102 may be software programs, applets or the like executing on a conventional computing system (e.g., a personal computer). In such embodiments, client 102 may encode, for example, some or all of a screen display typically provided to a user of the computing system for placeshifting to a remote location. One device capable of providing such functionality is the SlingProjector product available from Sling Media of Foster City, California, which executes on a conventional personal computer, although other products could be used as well. And again, the types of clients 102 used in system 100 are not limited to placeshifting devices; any other clients 102 that are capable of communicating on network 111 could be equivalently applied. Other types of client applications may include media players, personal video recorders (PVRs), video games, and/or any other types of clients as desired.

Network 111 is any digital or other communications network capable of transmitting messages between senders (e.g., client 102) and receivers (e.g., client 102). In various embodiments, network 111 includes any number of public or private data connections, links or networks supporting any number of communications protocols. Network 111 may include the Internet, for example, or any other network based upon TCP/IP or other conventional protocols, including any protocols or standards that are presently known or subsequently developed. In various embodiments, network 111 may also incorporate a wireless and/or wired telephone network, such as a cellular communications network for communicating with mobile phones, personal digital assistants, and/or the like. Various embodiments of network 111 may also incorporate any sort of wireless or wired local area networks, such as one or more IEEE 802.3 and/or IEEE 802.11 networks.

As noted above, directly connecting to a client 102 from a network service 116 may not always be convenient due to the presence of one or more firewalls or other security mechanisms within network 111, or any number of other factors. Various embodiments therefore provide any number of message servers 114A-D that are each capable of maintaining separate connections no with one or more clients 102A-D. Each message server 114A-D is implemented using conventional computer server hardware, software and/or services, as described more fully below in conjunction with FIG. 2. Each message server 114A-D suitably receives requests for connections 110A-D from one or more clients 102A-D. Such messages may be relayed in some embodiments from load balancing 112, as appropriate.

Each connection 110A-D may be initiated by the client 102A-D to facilitate convenient access, since many network security mechanisms will permit outgoing requests from client 102A-D more readily than incoming requests from server 116. Hence, each client 102A-D can be configured (e.g., through software or firmware) to establish a connection no with a message server 114A-D, as described herein. Clients 102 may establish such connections at startup, and/or at any other convenient time.

In various embodiments, each connection 110A-D is a persistent connection that can be readily maintained over time even when active communications with the client 110A-D are not needed. Connections no may be established using any protocols or techniques. Transmission control protocol (TCP) connections, for example, could be readily established and maintained over time in some embodiments since many firewalls will permit outgoing TCP connections from clients 102 located on a trusted network. Moreover, the TCP "keepalive" feature can be used to maintain an active connection no to the client 102 without substantial network overhead when the connection no is not in active use. Once a TCP connection no is established, for example, the connection no may be maintained over time by simply transmitting relatively low-overhead "keepalive" messages using the connection no to prevent the connection no from timing out. Examples of conventional TCP features are described in Internet RFC 1122, although many embodiments will use TCP, TCP-like and/or other features that may vary from the features described in this particular document.

By pre-establishing the connection no from the client 102 to the messaging server 114, a persistent channel is maintained over time even though the server is behind a firewall or other security feature. The pre-existing connection no can be used to transmit subsequent instructions and/or other messages to client 102 on behalf of one or more networked services 116A-C, as described more fully below.

In the example of FIG. 1, two separate clusters 120A-B of message servers 114 are shown, with each cluster 120 including any number of message servers 114 and associated load balancers 112. Clusters may be assigned to represent different types of clients 102, different geographic areas, different logical portions of a network (e.g., different portions of a network address space), and/or on any other basis. Other embodiments may eliminate clusters altogether and instead provide a single logical group of message servers 114, or even a single message server 114. The numbers of message servers 114A-D and the grouping of message servers 114 into clusters 120 will depend upon the particular needs of the services that are supported, the number of clients 102 that are supported, the processing capabilities of each message server 114, and/or any number of other factors.

In various embodiments, load balancers 112A-B may be provided to allocate message servers 114 and/or other resources efficiently and effectively. Load balancing 118 may be implemented using any combination of hardware and/or software resources or services, and may be based upon network traffic, processing loads on servers 120, geographic distribution of clients 102 and/or message servers 114, capabilities of clients 102 and/or any other factors as appropriate. In an exemplary embodiment, load balancers 112A-B receive loading information about each server 114 operating within the cluster 120. Loading information may be provided periodically (or on any other temporal basis) from each message server 114; in other embodiments, loading data may be additionally or alternately provided in response to requests from the load balancer 112 as desired.

As noted above, load balancing may be assigned to separate clusters 120A-B on any basis. In an example of such embodiments, clients 102 suitably contact an appropriate load balancer 112 (e.g., a load balancer 112 residing at a well-known or readily-obtainable URL or other network address) for the client location, type, or other parameters. The load balancer 112 associated with the proper cluster 120 would then assign the client request to an appropriate message server 114 operating within the cluster 120 based upon processing loads and/or other appropriate factors.

In other embodiments, some or all of the load balancing functionality may be shared between multiple clusters 120A-B as desired. Clients 102 may be configured, for example, to contact a common load balancer 112 at a well-known address or other network location. The common load balancer 112 may then allocate client connections between clusters 120A-B, message servers 114A-D or other resources on any basis. For example, clients of a particular type (e.g., a dedicated placeshifting device) may be directed toward a first cluster 120A, whereas clients of another type (e.g., a hybrid STB/placeshifting device) may be directed toward a different cluster 120B. The client type may be determined, for example, from a client identifier provided with the request message; the identifier value itself and/or the format of the identifier could indicate the type of client 102 that is sending the request. Differentiating clients 102 by type could allow message servers 114 operating within each cluster to be configured to support particular features that are appropriate for clients 102 of the assigned type. That is, certain types of clients 102 may not process certain types of messages that are available to other types of clients 102. In another example, clients 102 connecting from a particular geographic region may be directed toward a first cluster 120A that is located in (or otherwise associated with) that region, whereas clients 102 in a different geographic region may be directed toward a second cluster 120B in a different location. The geographic location of a client 102 may be determined from a network address (e.g., an internet protocol (IP) or other network address), or from any other physical or logical location information. Other embodiments may provide multiple levels of load balancing or routing; a first load balancer or router could determine a cluster 120 that is most appropriate for a requested connection, for example. The first load balancer could then forward the request to a second load balancer (e.g., load balancers 112A-B) associated with the appropriate cluster 120A-B for assignment to a particular message server 114A-D. Any number of additional clusters 120, load balancers 112 and/or message servers 114 may be provided and organized in any desired manner.

System 100 may support any number of network services 116A-C as desired. Each network service 116 is implemented using conventional network server hardware, software, services and/or other features as desired. The particular feature(s) provided by each network service 116 will vary from embodiment to embodiment. In an exemplary embodiment that supports placeshifting clients 102, for example, various network services 116 may support the establishment of relay connections between clients 102 and media players over network 111, online programming of DVR or other functions of clients 102 from remote locations, online viewing of content placeshifted from clients 102, customer service features, and/or any number of other features as desired. Other settings and applications may provide other network services 116, such as any services supporting online gaming, playing of media content, and/or the like.

In the embodiment shown in FIG. 1, each network service 116A-C identifies a message server 114A-D that maintains a connection 110A-D with a desired client 102A-D through service load balancer 118. In various embodiments, service load balancer 118 is able to identify message servers 114 associated with a particular client 102 by applying a hash or similar algorithmic method to a client identifier associated with the desired client 102. The results of this method could then be readily correlated to a particular server 114. In other embodiments, service load balancer 118 maintains a database or other listing that correlates clients 102 to particular message servers 114A-D. In various embodiments, service load balancer 118 may be physically and/or logically combined with load balancers 112A-B to provide a common load balancing system 112/118 that routes messages and facilitates communications between clients 102, services 116 and/or message servers 114 as desired. In other embodiments, service load balancer 118 is implemented in separate hardware or other logic from load balancers 112A-B.

To provide a message to a particular client 102 that has previously established a connection 110 to a particular message server 114, then, the network service 116 suitably provides a message the message server 114 that is maintaining the desired connection 110. The message may be routed to the appropriate server 114 from the service load balancer 118; that is, the network service 116 suitably provides a message to the load balancer 118, which performs a hash or other process on a client identifier or other data contained within the message to identify the particular message server 114 that is holding the connection 110 to the particular client 102. The message is then provided to the appropriate message server 114 to direct the message server 114 to contact the particular client 102 as desired. The message server 114 then transmits an appropriate message to the client 102 over the pre-existing connection 110. The particular message may contain a payload or other data provided by the network service 116 in some embodiments; other messages may simply contain information that directs the client 102 to contact network service 116 (or another host) for further action.

Upon receiving a message over connection 110, the receiving client 102 can process the received message in any manner. In some embodiments, the message may direct the client 102 to establish a second connection (e.g., a second outgoing TCP connection) to the requesting service 116 or another appropriate host. By pre-establishing a connection 110 with the client 102, then, various implementations may allow multiple services 116A-C to share the connection 110 with each client 102, thereby allowing a variety of messages to be transmitted to each client 102 from any number of different services 116. Moreover, messages sent from servers 116A-C can be provided to the client 102 on a relatively immediate basis in some embodiments. That is, if a server 116 wishes to contact a particular client 102, the server 116 need not wait until the client 102 polls the server 116, but rather can provide a message over connection 110 in real-time, or near real-time. "Real time" in this context refers to a communication that occurs in response to a stimulus (e.g., an initiating event such as a network request or a user input) without substantial delay between the stimulus and the communication. "Real time" communications, while typically occurring on a generally immediate basis, may nevertheless account for network and processing delays and other delays that are inherent in practical data communications systems.

FIG. 2 shows one example of a message server 114 that could be used to maintain any number of persistent connections 110 with any number of clients 102. As noted above, each cluster 120 or system 100 will typically include one or more message servers 114 organized in any physical and logical manner. To that end, each message server 114 within system 100 may be implemented with a server computer system or service that is based upon any processor, architecture and/or operating system. Each message server 114 will typically by implemented using any sort of conventional processing hardware 202, memory 204 and input/output features 205. Various embodiments may be implemented using dedicated or shared hardware servers; other implementations may make use of virtual server features as part of a "cloud computing" service, such as any of the cloud computing services provided by AMAZON, GOOGLE, MICROSOFT, IBM, UBUNTU, SUN MICROSYSTEMS and/or any number of other providers. In such embodiments, load balancers 112 and 118 and/or one or more network services 116 may also be implemented using cloud computing services as desired.

In various embodiments, each message server 114 is an actual or virtual computer system executing an operating system 206 such as any version of LINUX, UNIX, SOLARIS, NETWARE, WINDOWS, OS/X, AIX and/or the like. The various UNIX/LINUX operating systems typically provide a computing core that is capable of executing a message server application 208, as well as any number of daemons, processes, applications or other instance modules as desired. For example, a message server application 208 could execute as a daemon on message server 114, with each client connection 114 being managed as a separate process or instance that communicates with message server application 208 using features provided by operating system 208.

Message server application 208 is typically initiated when message server 114 is booted or otherwise initialized. In various embodiments, application 208 suitably registers with any appropriate load balancers 112 and/or 118 so that connections no can be appropriately distributed to message server 114. Application 208 then processes connection requests from clients 102 and/or network services 116 as appropriate. In the embodiment shown in FIG. 2, application 208 establishes connections no to clients 102, and maintains each of these connections no as active processes or instances. Application 208 may also provide any sort of connection log 212 or status information 214, as appropriate. In various embodiments, a daemon or other process can communicate using pre-established port numbers to facilitate convenient processing of received messages. For example, a "client" port (e.g., port 3490) could be monitored for messages received from clients 102, whereas a different "services" port (e.g., port 3400) could be monitored for messages received from services 116. Several examples of processes and tasks that may be provided by exemplary embodiments of application 208 are described below.

As connection requests are received from load balancer 112, various implementations of application 208 will register the client connection 110 with message server 114 as appropriate. Registration may involve responding to the TCP or other request made by the requesting client 102 to establish the connection, updating a table, database or other log 212 of connections maintained by application 208, and/or notifying load balancer 112 when the connection 110 is successfully established. Additional detail about establishing connections 110 is presented below in conjunction with FIG. 3.

As noted above, the established connections 110 may be used to send messages to clients 102 as requested by one or more network services 116. Messages may be sent to clients 102 via connections 110 in any manner. Some types of messages may simply provide a service identifier or other code to the client 102 that can be interpreted by the client 102 to provoke an appropriate reaction. A service identifier could simply provide a number of a requesting network service 116, for example, with a first value (e.g., "0001") identifying a first service 116A, a second value (e.g., "0002") identifying a second network service 116B, and so forth. When the client 102 receives a message containing the particular code, firmware or other logic within the client 102 can parse the code to contact the appropriate network service 116, or to take any other appropriate action. Certain codes could also be used to provide other responses by client 102. A simple "ping" service, for example, could be associated with a particular code (e.g., "0000") to provoke the client to simply transmit a short response to the message server 114. Other codes could be used for status requests or to provide other instructions to client 102, as desired.

In some embodiments, messages with payload data may be used in place of or in combination with coded messages as described above. In various embodiments, the message may include a data field that indicates the length of the payload (e.g., in bytes). The payload provided may be of any fixed or variable length, and may be formatted in any manner as desired.

Some embodiments may provide the ability to reset connections in response to messages sent by the load balancer 112 and/or another controlling entity. Such messages can direct the message server 114 to terminate a connection 110 to a particular client 102, and to remove the connection from the connection log 212 as appropriate. This may be beneficial if a message server 114 were to fail, or if the connection no were to somehow enter an unknown state. If multiple connections to a single client 102 were inadvertently established, for example, one or more of the connections could be terminated to avoid redundancy and/or to provoke the client 102 to re-establish a new, more reliable connection. In the meantime, message server 114 may transmit any messages that are intended for client 102 on each of the parallel connections until an active connection is identified. Further, load balancer 112 may instruct one or more message servers 114 to close or otherwise reset a connection 110 if the client 102 is also connected to another server 114. In some embodiments, clients 102 may be configured through firmware or the like to automatically contact load balancer 112 to obtain a new connection no when the active connection is reset or otherwise terminated.

Message server application 208 may also be configured to provide any status or reporting information 214 as requested. In various embodiments, application 208 is able to provide reporting information 214 in response to requests from load balancers 112 and/or 118, or any other controlling entity as desired. Information provided in response to various queries may include system status (e.g., connections maintained, processor load, memory or storage utilization, and/or the like), lists of client connections 110 (e.g., some or all of the information contained in log 212) and/or other information as desired.

Message server application 208 may provide any alternate and/or additional functions and features as desired. Generally, message server application 208 is implemented using conventional compiled object code derived from source code in any programming language (e.g., C, C++ or the like). Other embodiments may make use of an interpreted or other abstracted environment, such as the JAVA environment available from Sun Microsystems of Sunnyvale, California or the .NET environment available from Microsoft Corporation of Redmond, Washington Other embodiments may implement the various components of message server 114 using any other programming languages, scripting languages, development or execution environments, and/or the like. Such programming may be stored in source or object code form on any digital storage medium (e.g, memory 204, mass storage, removable media, or any other medium) that is accessible to message system 114.

Turning now to FIG. 3, an exemplary process 300 for establishing a connection 110 between a message server 114 and a client 102 over network 111 is shown. This connection 110 may be further used as shown to establish an interaction 328 between client 102 and network server 116 as desired.

Typically, client 102 initially contacts a message server 114 at startup or any other initializing state (function 302). As noted above, client 102 may initialize a connection with a message server 114 at startup, in response to a prior connection being dropped or reset, in response to a hard or soft re-boot of the client 102, and/or at any other appropriate time. This initialization may be driven by software or firmware executing within client 102; hence, changes to the initialization or connection processes may be implemented by updating software or firmware in client 102 in many embodiments.

Client 102 initially transmits a registration request 304 to message server 114 in any manner. In the example shown in FIG. 3, client 102 transmits the request 304 to a load balancer 112 that is available at a well-known or readily-determinable uniform resource locator (URL), internet protocol (IP) or other address. Request 304 may be sent using any format or protocol; in various embodiments, request 304 is a TCP message to facilitate convenient passage through network 111, including any firewalls or other security mechanisms that might prevent connections using other protocols. In such embodiments, request message 304 is sent within conventional TCP/IP frames that include sender addresses (e.g., IP addresses) and other information as appropriate. The body of request 304 may also include a client identifier that uniquely identifies the client 102 placing the request in some implementations.

Load balancer 112 receives and processes registration requests 304 from any number of clients 102 in any appropriate manner (function 305). In various embodiments, load balancer 112 suitably determines an appropriate message server 114 for maintaining the connection 110 with client 102. This determination may be based upon the client's geographic or logical location (as determined, for example, from an IP or other network address associated with client 102), the client type (as determined, for example, from a client identifier contained within request 304), current loading of servers 114 within a cluster 120, and/or any other factors as desired. Clients 102 may also be assigned based upon algorithmic processing (e.g., hashing) of a client identifier or the like that is contained within request 304. As noted above, multiple levels of load balancing may be provided to facilitate initial assignment to a cluster 120 of message servers 114 based upon client type and/or location, with subsequent assignment to a particular message server 114 based upon loading distribution within the assigned cluster 120. Any additional routing or load balancing may be provided as desired.

Load balancer 112 therefore assigns connections to various message servers 114 according to information about the requesting client 102, loading of the various message servers 114, and/or any other relevant information. Load balancer 112 suitably forwards the information in registration request 304 (including information about the requesting client 102) to the assigned message server 114 for subsequent processing. In various embodiments, load balancer 112 simply forwards the registration request 304 to the assigned message server 114 so that the assigned server 114 can respond to the TCP request 304 posited by the client 102. In equivalent embodiments, load balancer 112 may not provide the actual message to message server 114, but instead provides sufficient information (e.g., client identifiers, network address, etc.) to allow the message server 114 to appropriately respond to the request 304 and establish the persistent connection 110.

Upon receiving an assigned connection request from the load balancer 112, message server 114 appropriately processes the request (function 306) to register the assigned client 102. As noted above, registration function 306 may involve adding the client identifier to a connection log 212, as appropriate, and responding to the client's request 304 with a registration acknowledgement 308. The registration acknowledgement 308 may be in TCP format in response to a TCP request 304 posited by the client.

After the request 304 and response 308 from the message server, a persistent connection 110 can be established for subsequent communications. As noted above, message server 114 and/or load balancer 112 will maintain the connection over time (function 310) by transmitting "keepalive" packets or the like to prevent the connection 110 from timing out or otherwise terminating. Such packets provide a relatively convenient mechanism for maintaining the reliable connection 110 without significant latency or overhead. Other embodiments may maintain the connection 110 in any other manner. Although not shown in FIG. 3, equivalent embodiments may provide a confirmation acknowledgement from message server 114 to load balancer 112 after the connection 110 is successfully established. Still other embodiments may provide a negative acknowledgement ("NAK") when the connection 110 is not successfully created.

After the connection 110 is established, subsequent messages may be provided to client 102 via message server 114. As a network service 116 desires to contact a particular client 102 (function 312), the service 116 provides an appropriate message 314 to the message server 114 that is maintaining the connection no with the client 102 of interest. To that end, network service 116 may provide the message 314 to service load balancer 118, as shown in FIG. 3. In equivalent embodiments, network service 116 simply posits a query to the service load balancer 118 to determine the particular message server 114 maintaining the connection 110 of interest. In such embodiments, messages 314 may be transmitted directly from network service 116 to message server 114, as appropriate. Message 314 will typically include an identifier associated with the client 102 and/or connection no so that the message server 114 is able to determine the particular client 102 that will receive the message 314 using algorithmic or other techniques.

When a message server 114 receives a message 314 from a network service 116, the message server is able to relay the message 316 to the client 102 via the pre-established connection 110. As briefly noted above, the message 316 may simply include a service identifier or other code that simply allows client 102 to contact the appropriate network service 116 at a well-known or easily determined location on network 111 (e.g., a known URL or IP address). Other messages 316 may include a payload portion that is provided from network service 116 as part of message 314. In embodiments that support this feature, the payload may be formatted and relayed to client 102 as appropriate. Other types of messages 316 may be formulated and transmitted in other embodiments.

After message 316 is sent, message server 114 may take any of various actions based upon the success or failure of message delivery to client 102. In some implementations, client 102 acknowledges message receipt with an acknowledgement message 318. This acknowledgement may be relayed back to the network service 116 in some embodiments. If no acknowledgement 318 is received, message server 114 may provide a timeout message 322 to network service 116 after an appropriate period of time. The "appropriate period" may be any pre-determined time period that is appropriately set for the particular application and network environment. In some embodiments, the appropriate period may be configured by an administrator. Some implementations may support additional message types, such as negative acknowledgements (NAK) for unsuccessful attempts to contact the recipient, "busy" messages if communications are already in progress, "invalid" messages if incorrectly formatted or otherwise invalid messages are received, and/or the like.

Client 102 processes the received message 316 as appropriate for the particular message 316 (function 324). In various embodiments, client 102 simply parses a service identifier or other code contained within the body of the message 316 to contact the associated network service 116. In such cases, client 102 suitably transmits a second TCP (or similar) request 326 directly to the server to establish an interaction session 328. Session 328 may be maintained on any temporary or persistent basis, and may be continued for any duration. In some implementations, the interaction 328 will be relatively short (e.g., if network service 116 simply wishes to provide brief instructions to client 102), whereas other connections may be more ongoing (e.g., if network service 116 is receiving, redirecting or otherwise processing a media stream from client 102).

In some cases (or for other types of messages 316), interaction 328 may not be needed if message 316 contains enough information to provoke the desired response in client 102. Certain embodiments may provide "payload" messages, for example, that allow client 102 to extract and process a payload contained within the message 316 as appropriate. Still other messages 316 may provide a service identifier or other code that can be interpreted by client 102 to produce an appropriate response.

Generally speaking, the various tasks shown in connection with process 300 may be carried out with any sort of hardware, software and/or firmware logic within system 100. Portions of process 300 may be carried out, for example, by a message server 114 (FIG. 1) operating in conjunction with any appropriate client 102 and/or network service 116 as appropriate. In various embodiments, the various steps of process 300 are carried out in response to software or firmware instructions stored in a memory, or on a disk drive and/or other storage associated with message server 114, load balancer 112, network service 116 and/or client 102. Such instructions may be executed by any processor and/or other processing features within message server 114, client 102, load balancers 112 and 118, network service 116 and/or the like as indicated in FIG. 3. The particular means used to implement each of the various functions shown in FIG. 3, then, could be any sort of processing hardware (such as hardware associated with message server 114, client 102, load balancers 112 and 118, and/or network service 116 of FIG. 1) executing conventional software logic in any format that implements the various algorithms and techniques described herein.

Various examples of systems, devices and processes for establishing connections between clients and servers over a digital network have been described. Several of the exemplary techniques described herein allow clients and servers to initially establish persistent TCP or other connections with a message server. This connection may be used by any network service to support features associated with placeshifting, media playing, gaming and/or any other networked applications. For example, connections to clients located behind firewalls or other security mechanisms can be established in real-time (or near real-time) in a flexible yet efficient manner. This pre-established connection can be used for any number of applications. As an example, a network customer service application could use the pre-established connection to direct a particular client device to contact a server that allows a customer service representative to remotely configure the client device. Other embodiments may provide other services, such as remote programming (e.g., remote programming of a DVR or similar device), remote establishment of relay connections (e.g., between a client device and a media player or the like), or any other online interaction with the client device. Many other network services could be provided for placeshifting, media streaming, gaming, remote programming, remote monitoring, remote configuration and/or any number of other applications. Other embodiments may exhibit other benefits and features as well.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process executable by a computer system operating as a media device that communicates with a message server via a network, the automated process comprising:
    initiating an outgoing connection between the message server and the media device via the network;
    maintaining the outgoing connection between the message server and the media device as a persistent connection;
    subsequently receiving, by the media device, a message sent from the message server to the media device via the previously-established persistent connection, wherein the message identifies a network service; and
    in response to the message, initiating a second outgoing connection from the media device to the network service.

2. The automated process of claim 1 wherein the media device operates behind a firewall that resides between the media device and the network.

3. The automated process of claim 1 wherein the maintaining comprises transmitting keep-alive messages via the persistent connection.

4. The automated process of claim 3 wherein the connection is a transmission control protocol (TCP) connection.

5. The automated process of claim 1 wherein the media device is a digital video recorder.

6. The automated process of claim 1 wherein the message comprises a payload that contains an instruction.

7. The automated process of claim 1 wherein the network service is identified by a hash value of an identifier associated with the network service.

8. The automated process of claim 1 wherein the media device is a placeshifting device, and wherein the message identifies a requesting device to the placeshifting device to thereby allow the placeshifting device to directly contact the requesting device by initiating an outgoing connection to the requesting device from behind a firewall that isolates the placeshifting device from the network.

9. A media device that communicates with a message server via a network, the media device comprising a processor and a non-transitory data storage having computer executable instructions stored thereon that, when executed by the processor, perform an automated process comprising:
  initiating an outgoing connection between the message server and the media device via the network;
  maintaining the outgoing connection between the message server and the media device as a persistent connection;
  subsequently receiving, by the media device, a message sent from the message server to the media device via the previously-established persistent connection, wherein the message comprises an identifier of a network service and an instruction to be performed by the media device, wherein the instruction directs the media device to establish a second connection from the media device to the network service identified in the message received via the persistent connection; and
  in response to the message, executing the instruction received in the message via the persistent connection.

10. The media device of claim 9 wherein the media device operates behind a firewall that resides between the media device and the network, and wherein the second connection is established as by the media device as an outgoing connection through the firewall to the network service.

11. The media device of claim 10 wherein the maintaining comprises transmitting keep-alive messages via the persistent connection.

12. The media device of claim 11 wherein the persistent connection is a transmission control protocol (TCP) connection.

* * * * *